United States Patent
Chen

(10) Patent No.: US 10,401,972 B2
(45) Date of Patent: Sep. 3, 2019

(54) FORCE-SENSITIVE INPUT DEVICE

(71) Applicant: Primax Electronics Ltd., Taipei (TW)

(72) Inventor: Chung-Yuan Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/716,936

(22) Filed: Sep. 27, 2017

(65) Prior Publication Data

US 2018/0101242 A1 Apr. 12, 2018

Related U.S. Application Data

(60) Provisional application No. 62/405,003, filed on Oct. 6, 2016.

(51) Int. Cl.
*G06F 3/02* (2006.01)
*G06F 1/16* (2006.01)
*H01H 13/14* (2006.01)
*H01H 13/83* (2006.01)

(52) U.S. Cl.
CPC .......... *G06F 3/0219* (2013.01); *G06F 1/1662* (2013.01); *H01H 13/14* (2013.01); *H01H 13/83* (2013.01); *G06F 3/0227* (2013.01); *H01H 2219/039* (2013.01); *H01H 2219/062* (2013.01); *H01H 2227/032* (2013.01)

(58) Field of Classification Search
None
See application file for complete search history.

(56) References Cited

U.S. PATENT DOCUMENTS

2017/0040127 A1* 2/2017 Chang .................... H01H 13/83
2017/0117105 A1* 4/2017 Chen ...................... H01H 3/125

* cited by examiner

*Primary Examiner* — Kenneth B Lee, Jr.
(74) *Attorney, Agent, or Firm* — Kirton McConkie; Evan R. Witt

(57) ABSTRACT

A force-sensitive input device includes a circuit board, plural keys, plural force sensing modules and a display module. When one of the plural keys is pressed down, the corresponding force sensing module senses a magnitude of a pressing force and generates a corresponding sensing signal to the display module. According to the magnitude of the pressing force, the display module is in a corresponding displaying mode. Consequently, the user realizes the magnitude of the pressing force.

3 Claims, 10 Drawing Sheets

FORCE-SENSITIVE INPUT DEVICE

CROSS-REFERENCE TO RELATED APPLICATION

This application claims the benefit of U.S. Provisional Patent Application No. 62/405,003 filed Oct. 6, 2016, the contents of which are incorporated herein by reference.

FIELD OF THE INVENTION

The present invention relates to a force-sensitive input device, and more particularly to a force-sensitive input device capable of indicating the magnitude of a pressing force exerted by the user.

BACKGROUND OF THE INVENTION

An input device is an essential device for people in the modern society. For example, a conventional keyboard is one of the common input devices. The conventional keyboard comprises plural keys. When one of the keys is pressed, a command is inputted through the keyboard. Generally, the conventional keyboard has many types according to the designs of generating the key signal. For example, a force-sensitive input device is one type of the conventional keyboard. Moreover, one key of the force-sensitive input device is designed to sense the magnitude of the pressing force. According to the magnitude of the pressing force, a corresponding function is triggered. For example, in case that a force of 0~30 grams is applied to the key, the key is pressed down to a shallower position. Consequently, a first predetermined function is triggered. In case that a force of 30~60 grams is applied to the key, the key is pressed down to a deeper position. Consequently, a second predetermined function is triggered. That is, when the pressing force with the first magnitude or the pressing force with the second magnitude is selectively applied to the same key, the corresponding predetermined function is enabled.

However, the conventional force-sensitive input device still has some drawbacks. For example, while the key is pressed by the user, it is difficult for the use to finely perceive the pressing force that is exerted by the user. That is, the user cannot actually trigger the desired function. In some situations, the undesired function is erroneously triggered. The use of the force-sensitive input device usually perplexes the user.

Therefore, there is a need of providing an improved force-sensitive input device in order to overcome the above drawbacks.

SUMMARY OF THE INVENTION

The present invention provides a force-sensitive input device. The force-sensitive input device includes a display module. According to the magnitude of the pressing force exerted on the key, the display module is in a corresponding displaying mode. Since the user realizes the magnitude of the pressing force on the key, the function corresponding to the magnitude of the pressing force can be precisely triggered.

In accordance with an aspect of the present invention, there is provided a force-sensitive input device. The force-sensitive input device includes a circuit board, plural keys, plural force sensing modules and a display module. The plural keys are disposed on the circuit board. Each of the plural keys includes a keycap, a main body, a triggering element and an elastic element. The main body is located under the keycap. The triggering element is connected with the keycap and linked with the keycap. A first end of the elastic element is contacted with the main body or the circuit board. A second end of the elastic element is contacted with the keycap or the triggering element. As the keycap is moved downwardly in response to a pressing force, the triggering element is descended and the elastic element is subjected to deformation so as to store elastic potential energy. The force sensing modules are located under the corresponding keys. When one of the plural keys is pressed down, the force sensing module corresponding to the pressed key senses a magnitude of the pressing force on the pressed key and generates a corresponding sensing signal. The display module is disposed on the circuit board. The display module illuminates according to the sensing signal from the corresponding force sensing module.

In an embodiment, the force-sensitive input device further includes a casing. The circuit board, the plural keys, the plural force sensing modules and the display module are disposed within the casing. The keycap of each key is penetrated through the casing and exposed outside the casing.

In an embodiment, the display module includes plural light-emitting elements, and the plural light-emitting elements are disposed on the circuit board and located under the corresponding keys. The keycap is made of a transparent material, so that a light beam emitted by the corresponding light-emitting element is transmissible through the keycap.

In an embodiment, the magnitude of the pressing force exerted on the pressed key and sensed by the corresponding force sensing module is within a force sensing range, and the force sensing range includes a low force range and a high force range. If the magnitude of the pressing force exerted on the pressed key and sensed by the corresponding force sensing module is within the low force range, the light-emitting element corresponding to the pressed key emits the light beam with a first light color. If the magnitude of the pressing force exerted on the pressed key and sensed by the corresponding force sensing module is within the high force range, the light-emitting element corresponding to the pressed key emits the light beam with a second light color.

In an embodiment, the magnitude of the pressing force exerted on the pressed key and sensed by the corresponding force sensing module is within a force sensing range, and the force sensing range includes a low force range and a high force range. If the magnitude of the pressing force exerted on the corresponding key and sensed by the corresponding force sensing module is within the low force range, the light-emitting element corresponding to the pressed key and neighboring light-emitting elements emit the light beams with a first light color. If the magnitude of the pressing force exerted on the pressed key and sensed by the corresponding force sensing module is within the high force range, the light-emitting element corresponding to the pressed key and the neighboring light-emitting elements emit the light beams with a second light color.

In an embodiment, the display module includes plural light-emitting elements, and the plural light-emitting elements are disposed on the circuit board, arranged beside the plural keys and exposed outside the casing. The plural light-emitting elements of the display module are continuously arranged as a reading meter. The reading meter indicates a low level brightness indication and a high level brightness indication.

In an embodiment, the magnitude of the pressing force exerted on the corresponding key and sensed by the corresponding force sensing module is within a force sensing range, and the force sensing range includes a low force range and a high force range. If the magnitude of the pressing force exerted on the pressed key and sensed by the corresponding force sensing module is within the low force range, the low level brightness indication is illuminated. If the magnitude of the pressing force exerted on the pressed key and sensed by the corresponding force sensing module is within the high force range, the low level brightness indication and the high level brightness indication are simultaneously illuminated, or the low level brightness indication is illuminated but the high level brightness indication is not illuminated.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
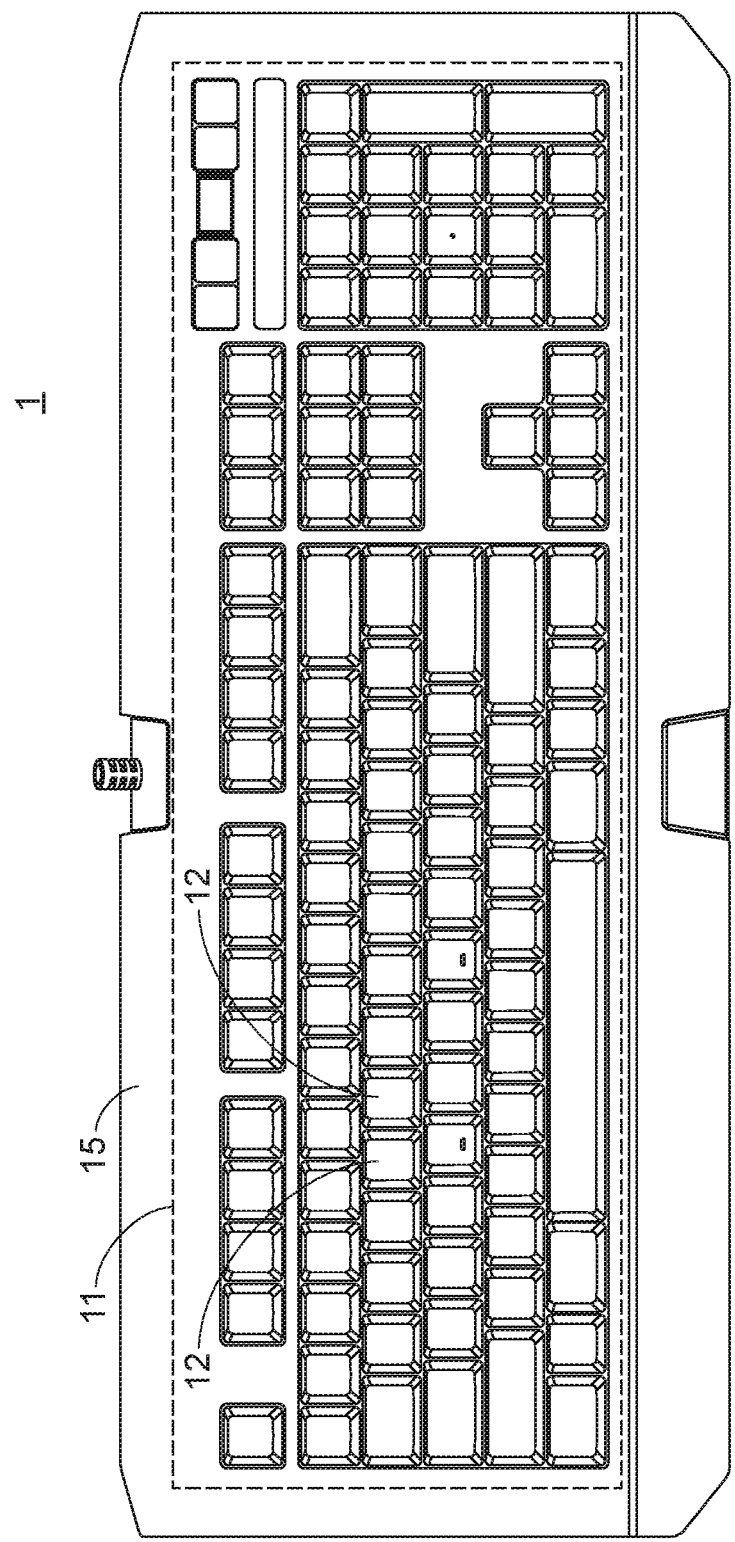
FIG. 1 is a schematic top view illustrating a force-sensitive input device according to an embodiment of the present invention.
Figure 2:
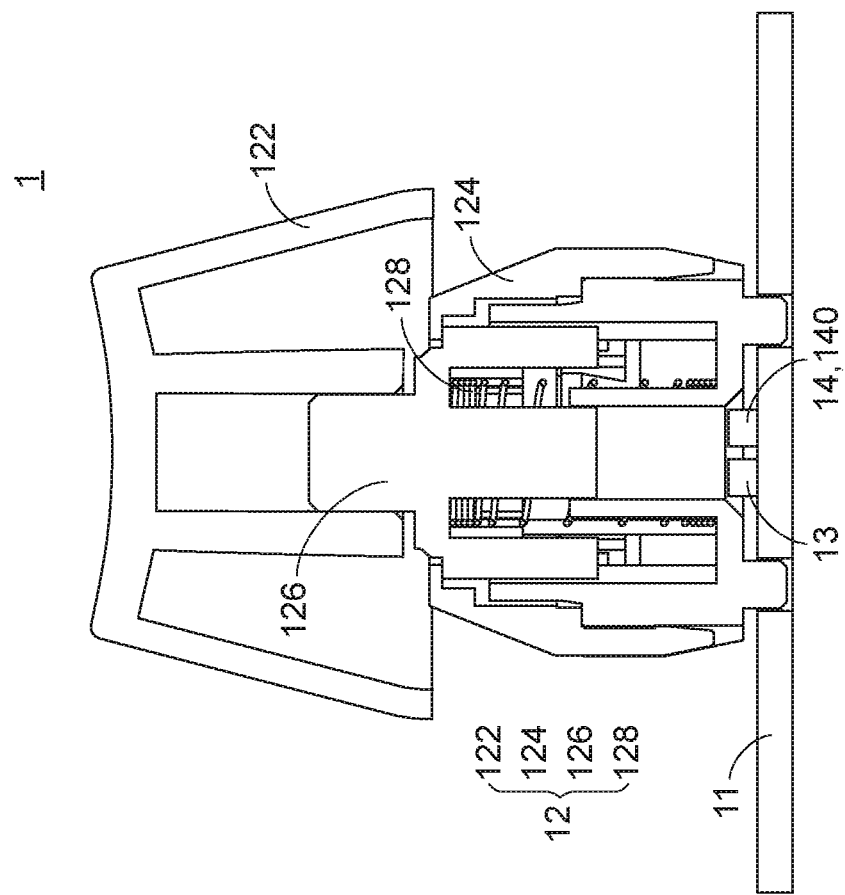
FIG. 2 is a schematic top view illustrating a key of the force-sensitive input device according to the embodiment of the present invention, in which the key is not pressed down.

Please refer to FIGS. 1 and 2. FIG. 1 is a schematic top view illustrating a force-sensitive input device according to an embodiment of the present invention. FIG. 2 is a schematic top view illustrating a key of the force-sensitive input device according to the embodiment of the present invention, in which the key is not pressed down. In this embodiment, the force-sensitive input device 1 has the profile of keyboard. It is noted that the profile of the force-sensitive input keyboard is not restricted. In some other embodiments, the force-sensitive input device 1 is mouse or any other appropriate input device.

As shown in FIGS. 1 and 2, the force-sensitive input keyboard 1 comprises a circuit board 11, plural keys 12, plural force sensing modules 13, a display module 14 and a casing 15. The circuit board 11, the plural keys 12, the plural force sensing modules 13 and the display module 14 are disposed within the casing 15. The plural keys 12 are installed on the circuit board 11. When at least one of the plural keys 12 is pressed by the user, a corresponding command is inputted.

For precisely detecting the magnitude of the pressing force on each key 12, one force sensing module 13 is located under the corresponding key 12 in order to sense the magnitude of the pressing force. Preferably, the force sensing modules 13 and the keys 12 are in a one-to-one arrangement. In some other embodiments, the force sensing modules 13 and the keys 12 are in a many-to-one arrangement or a one-to-many arrangement. An example of the force sensing module 13 includes but is not limited to a non-contact capacitive sensing module, a contact capacitive sensing module, a resistive sensing module, an optical sensing module or a mechanical sensing module.

In an embodiment, the key 12 comprises a keycap 122, a main body 124, a triggering element 126 and an elastic element 128. The keycap 122 of the key 12 is partially penetrated through the casing 15 or completely exposed outside the casing 15. Consequently, the keycap 122 can be pressed by a user. The main body 124 is a key housing and located under the keycap 122. The triggering element 126 is connected with the keycap 122 and movable relative to the keycap 122. When the keycap 122 is pressed down in response to a pressing force of the user, the triggering element 126 is moved downwardly with the keycap 122 to trigger the corresponding function. For example, the triggering mechanism includes a mechanical triggering mechanism or an optical triggering mechanism for triggering the circuit board 11 or triggering an additional component. The elastic element 128 is a restoring mechanism. A first end of the elastic element 128 is contacted with the main body 124 or the circuit board 11. A second end of the elastic element 128 is contacted with the keycap 122 or the triggering element 126. As the keycap 122 is moved downwardly in response to the pressing force, the triggering element 126 is descended. Under this circumstance, the elastic element 128 is subjected to deformation (see FIGS. 3 and 4) so as to store elastic potential energy. When the keycap 122 is no longer pressed, the elastic potential energy of the elastic element 128 is released and the elastic element 128 is gradually restored to its original shape. Consequently, the keycap 122 and the triggering element 126 are returned to its original position.

While the magnitude of the pressing force of the user exerted on the key 12 is sensed by the force sensing module 13, the force sensing module 13 generates a sensing signal.

In an embodiment, the sensing signal is directly transmitted to the display module 14. In another embodiment, the sensing signal is indirectly converted to another signal and transmitted to the display module 14. According to the sensing signal from the corresponding force sensing module 13, the display module 14 emits light beams. Consequently, the magnitude of the pressing force of the user is indicated by the display module 14. In an embodiment, the display module 14 comprises plural light-emitting elements 140. The light-emitting elements 140 are disposed on the circuit board 11. Each light-emitting element 140 is located under the corresponding key 12. The keycap 122 and the triggering element 126 are made of transparent material or a translucent material. After the light beam from the light-emitting element 140 is transmitted through the corresponding keycap 122 and the corresponding triggering element 126 of the corresponding key 12, the illuminating condition is observed by the user. Consequently, the user can realize the magnitude of the pressing force.

Figure 3:
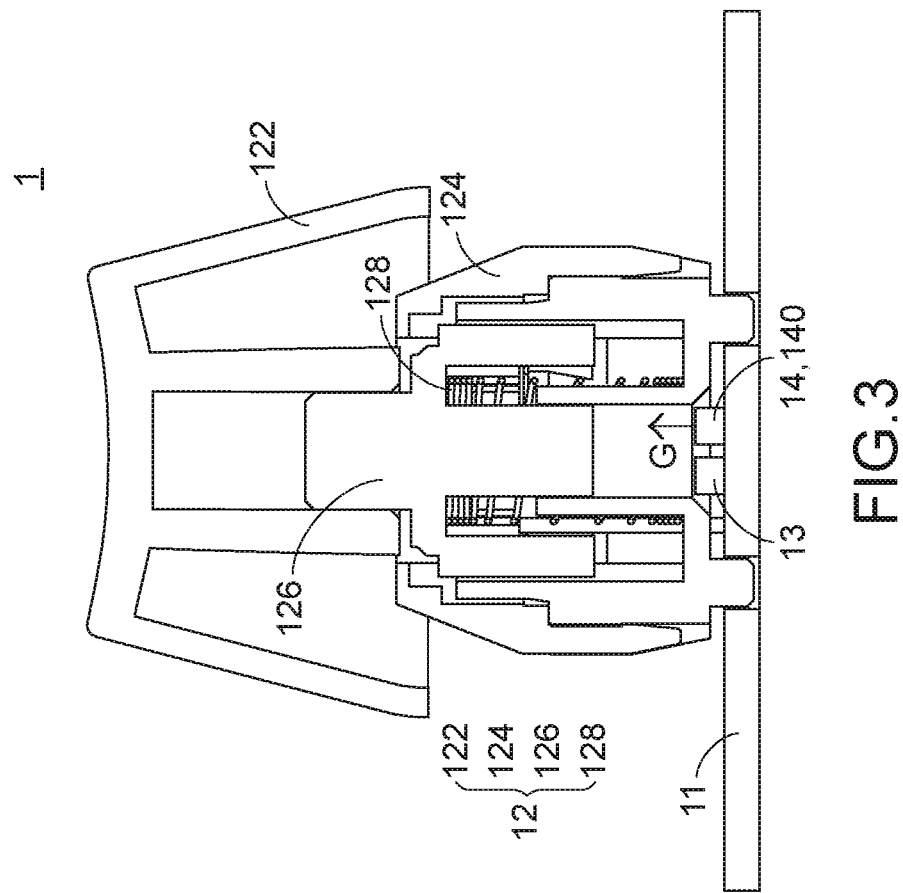
FIG. 3 is a schematic top view illustrating a key of the force-sensitive input device according to the embodiment of the present invention, in which the key is pressed down to a shallower position.

FIG. 3 is a schematic top view illustrating a key of the force-sensitive input device according to the embodiment of the present invention, in which the key is pressed down to a shallower position. In case that the magnitude of the pressing force is smaller, the light-emitting element 140 under the pressed key 12 emits the light beam with a first color. As shown in FIG. 3, the light-emitting element 140 of the display module 14 emits a green light G to prompt the user.

Figure 4:
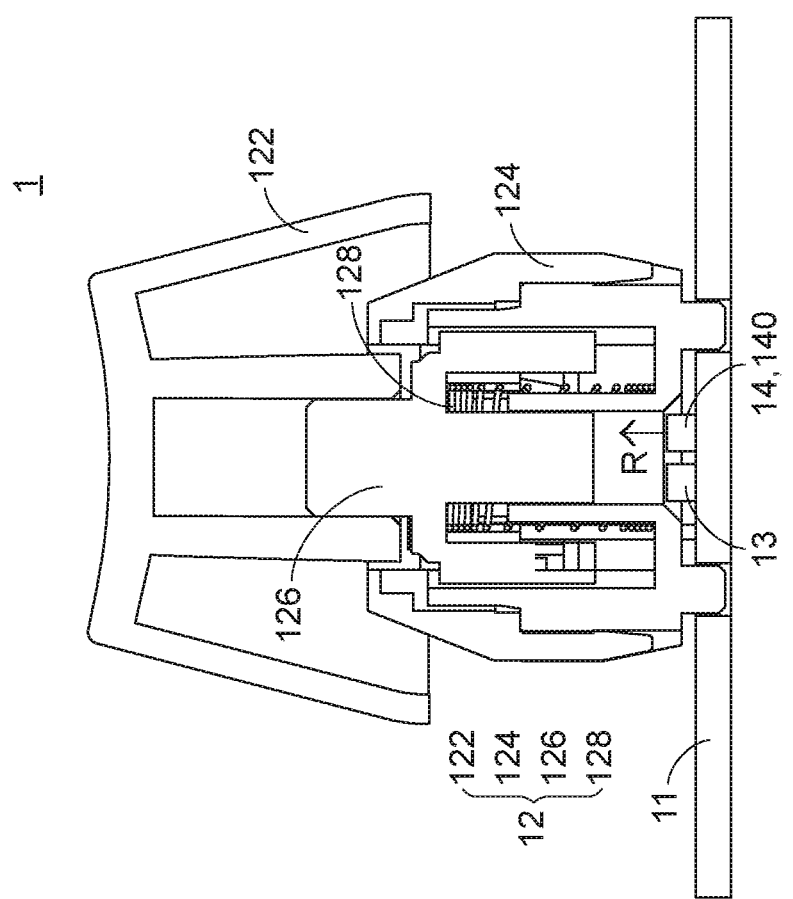
FIG. 4 is a schematic top view illustrating a key of the force-sensitive input device according to the embodiment of the present invention, in which the key is pressed down to a deeper position.

FIG. 4 is a schematic top view illustrating a key of the force-sensitive input device according to the embodiment of the present invention, in which the key is pressed down to a deeper position. In case that the magnitude of the pressing force is larger, the light-emitting element 140 under the pressed key 12 emits the light beam with a second color. As shown in FIG. 4, the light-emitting element 140 of the display module 14 emits a red light R to prompt the user.

The light color shown on the display module 14 prompts the user to realize whether the magnitude of pressing force exerted by the user is small or large. The terms "small" and "large" indicate the relative magnitudes of the pressing force. In an embodiment, the magnitude of the pressing force exerted on the key 12 and sensed by the force sensing module 13 is classified into several force levels. For example, these force levels are in the range between 0 and 30 grams, in the range between 30 and 60 grams and in the range between 60 and 90 grams. It is noted that the ranges of different force levels of the pressing force are not restricted. According to the force level of the pressing force, the display module 14 is in a corresponding displaying mode. By observing the display module 14, the user can realize the pressing force of the user. Consequently, each of the functions corresponding to 0~30 grams, 30~60 grams or 60~90 grams is convenient to be triggered by the user.

Moreover, the light-emitting elements 140 of the display module 14 are designed to emit light beams in three illuminating models.

Figure 5:
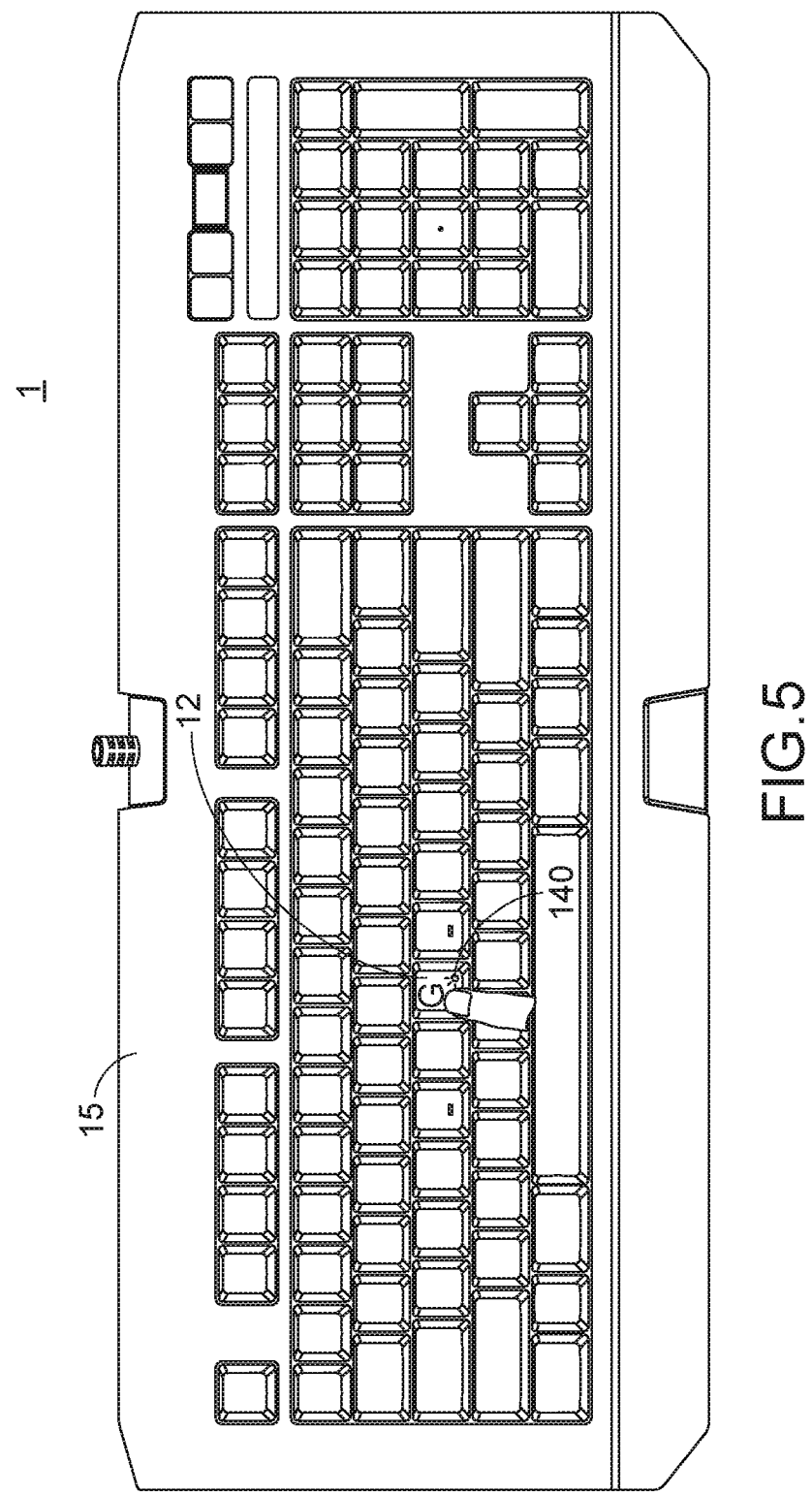
FIG. 5 is a schematic top view illustrating the force-sensitive input device according to the embodiment of the present invention, in which the key is pressed down to the shallower position and the display module emits light beams in a first illuminating model.
Figure 6:
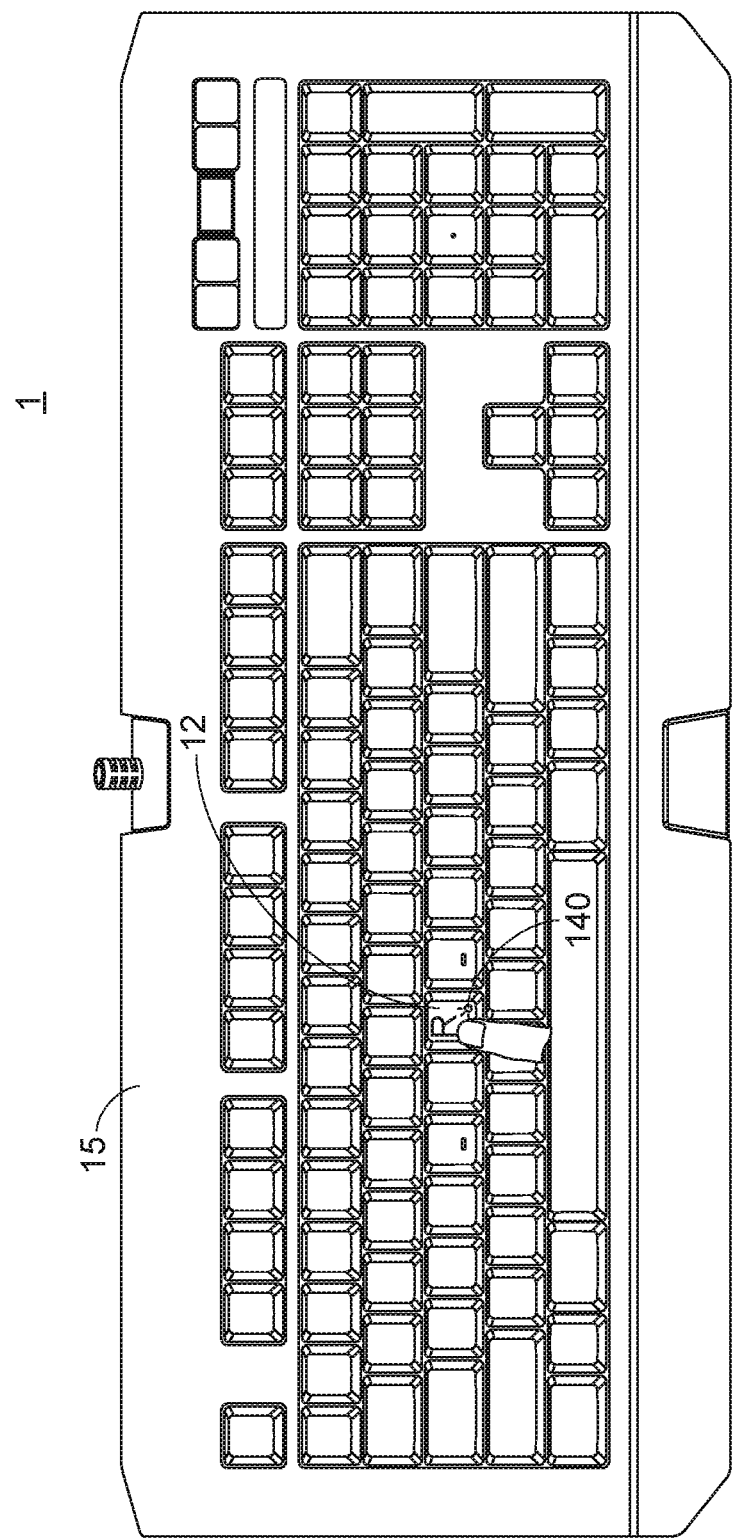
FIG. 6 is a schematic top view illustrating the force-sensitive input device according to the embodiment of the present invention, in which the key is pressed down to the deeper position and the display module emits light beams in the first illuminating model.

The first illuminating model of the display module 14 will be described with reference to FIGS. 5 and 6. FIG. 5 is a schematic top view illustrating the force-sensitive input device according to the embodiment of the present invention, in which the key is pressed down to the shallower position and the display module emits light beams in a first illuminating model. FIG. 6 is a schematic top view illustrating the force-sensitive input device according to the embodiment of the present invention, in which the key is pressed down to the deeper position and the display module emits light beams in the first illuminating model. Please refer to FIGS. 2, 3, 4, 5 and 6. In the first illuminating model, only the light-emitting element 140 under the pressed key 12 emits the light beam when the key 12 is pressed down. The other light-emitting elements 140 do not emit light beams. Moreover, the magnitude of the pressing force exerted on the key 12 and sensed by the corresponding force sensing module 13 is in a force sensing range. The force sensing range includes a low force range and a high force range. When the key 12 is pressed down to the shallower position, the magnitude of the pressing force exerted on the key 12 and sensed by the corresponding force sensing module 13 is in the low force range. Consequently, the light-emitting element 140 under the pressed key 12 emits a green light G to prompt the user that the magnitude of the pressing force is smaller. When the key 12 is pressed down to the deeper position, the magnitude of the pressing force exerted on the key 12 and sensed by the corresponding force sensing module 13 is in the high force range. Consequently, the light-emitting element 140 under the pressed key 12 emits a red light R to prompt the user that the magnitude of the pressing force is larger. Of course, the light color may be varied according to the practical requirements.

Figure 7:
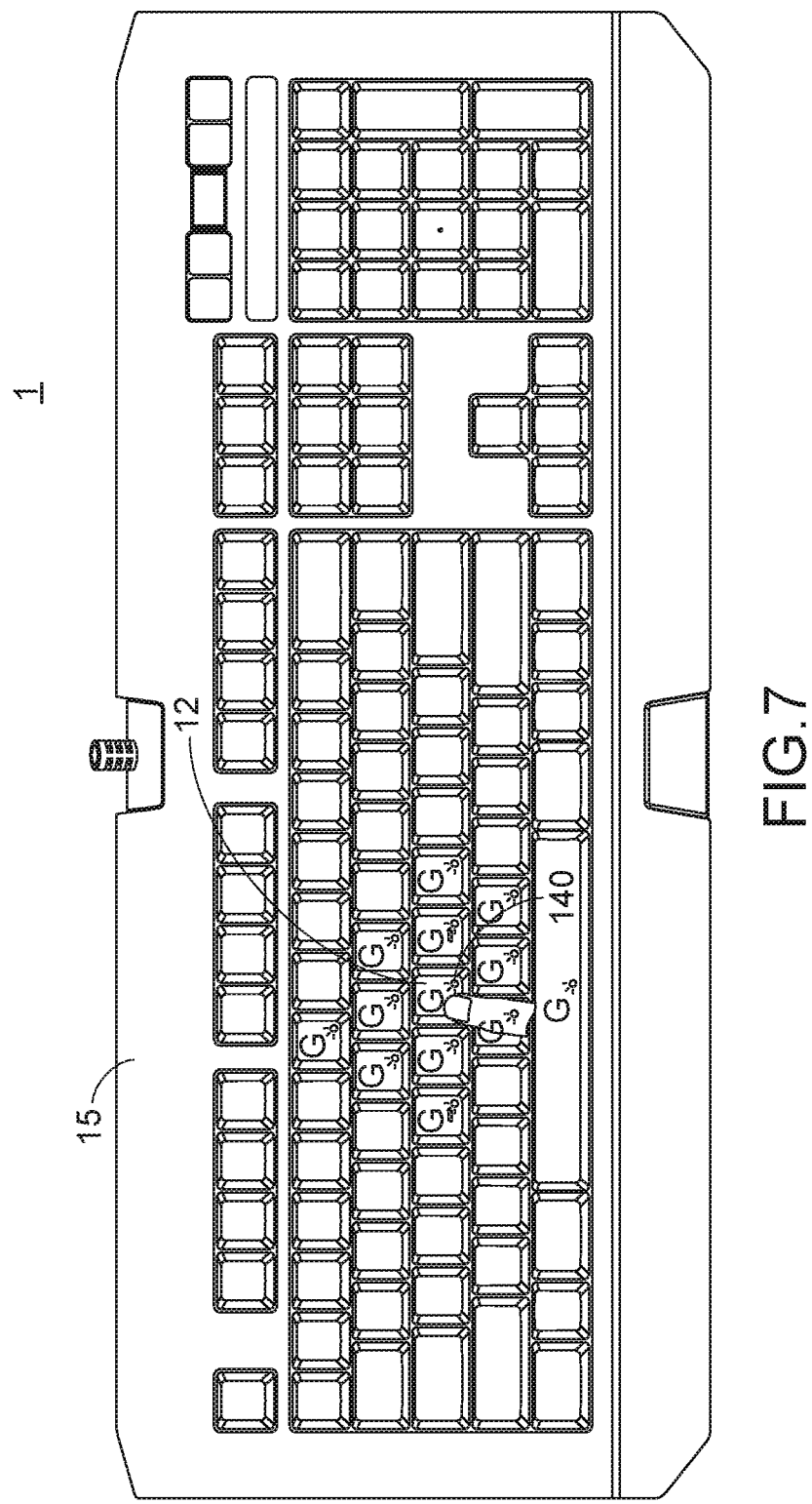
FIG. 7 is a schematic top view illustrating the force-sensitive input device according to the embodiment of the present invention, in which the key is pressed down to the shallower position and the display module emits light beams in a second illuminating model.
Figure 8:
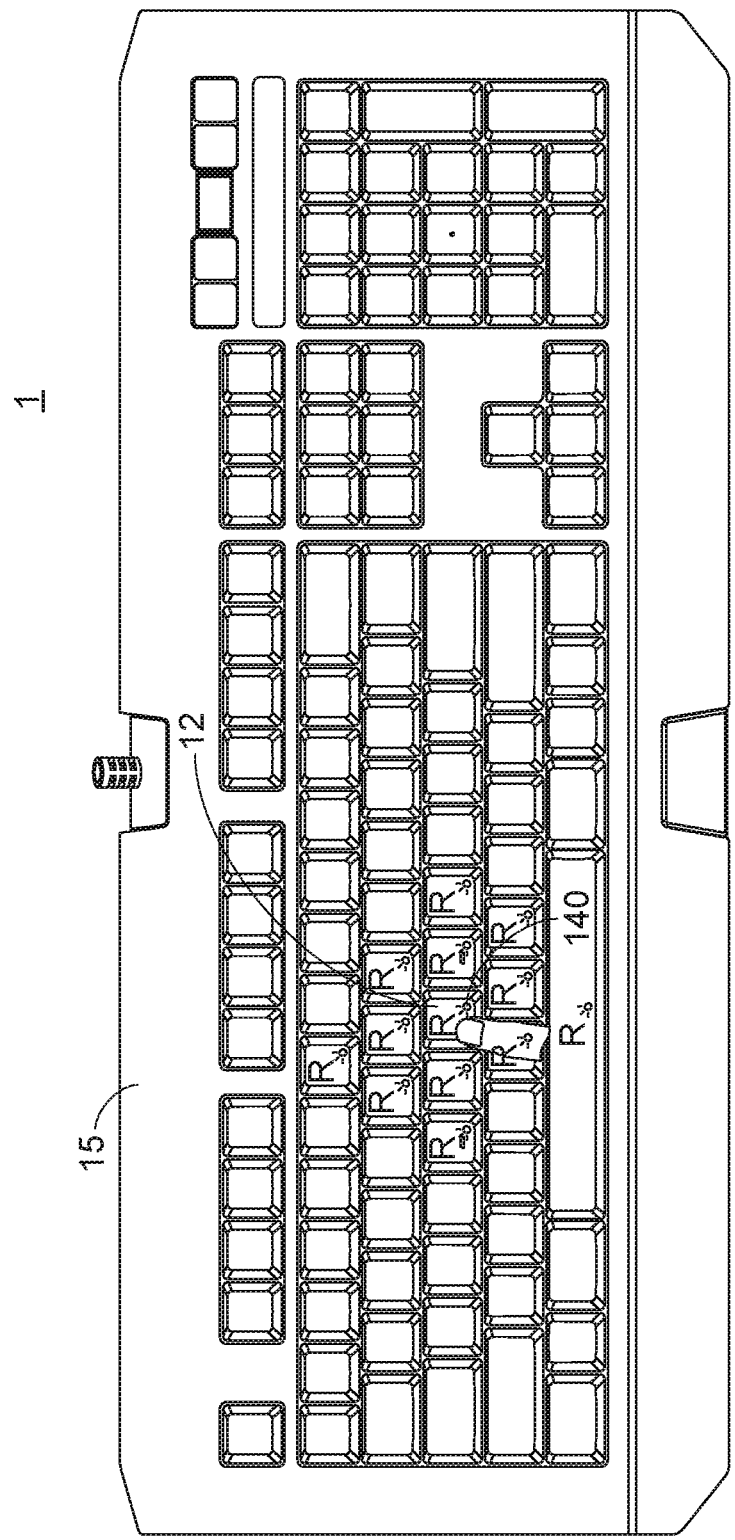
FIG. 8 is a schematic top view illustrating the force-sensitive input device according to the embodiment of the present invention, in which the key is pressed down to the deeper position and the display module emits light beams in the second illuminating model.

The second illuminating model of the display module 14 will be described with reference to FIGS. 7 and 8. FIG. 7 is a schematic top view illustrating the force-sensitive input device according to the embodiment of the present invention, in which the key is pressed down to the shallower position and the display module emits light beams in a second illuminating model. FIG. 8 is a schematic top view illustrating the force-sensitive input device according to the embodiment of the present invention, in which the key is pressed down to the deeper position and the display module emits light beams in the second illuminating model. Please refer to FIGS. 2, 3, 4, 7 and 8. In the second illuminating model, the light-emitting element 140 under the pressed key 12 and the neighboring light-emitting elements 140 emit the light beams when the key 12 is pressed down. In an embodiment, the light-emitting element 140 under the pressed key 12 and the neighboring light-emitting elements 140 emit light beams simultaneously. Alternatively, the light-emitting element 140 under the pressed key 12 emits the light beam at first, and then the neighboring light-emitting elements 140 emit the light beams after a time difference. In case that the time difference is specially designed, a rippling effect is generated. Moreover, the magnitude of the pressing force exerted on the key 12 and sensed by the corresponding force sensing module 13 is in a force sensing range. The force sensing range includes a low force range and a high force range. Similarly, when the key 12 is pressed down to the shallower position, the magnitude of the pressing force exerted on the key 12 and sensed by the corresponding force sensing module 13 is in the low force range. Consequently, the light-emitting element 140 under the pressed key 12 and the neighboring light-emitting elements 140 emit a green light G. Similarly, when the key 12 is pressed down to the deeper position, the magnitude of the pressing force exerted on the key 12 and sensed by the corresponding force sensing module 13 is in the high force range. Consequently, the light-emitting element 140 under the pressed key 12 and the neighboring light-emitting elements 140 emit a red light R. Of course, the light color may be varied according to the practical requirements.

It is noted that the second illuminating model may be modified. For example, in a variant example, the illuminating area of the neighboring light-emitting elements 140 is related to the magnitude of the pressing force. For example, as the magnitude of the pressing force increases, the illuminating area of the neighboring light-emitting elements 140 increases. Whereas, as the magnitude of the pressing force decreases, the illuminating area of the neighboring light-emitting elements 140 decreases.

Figure 9:
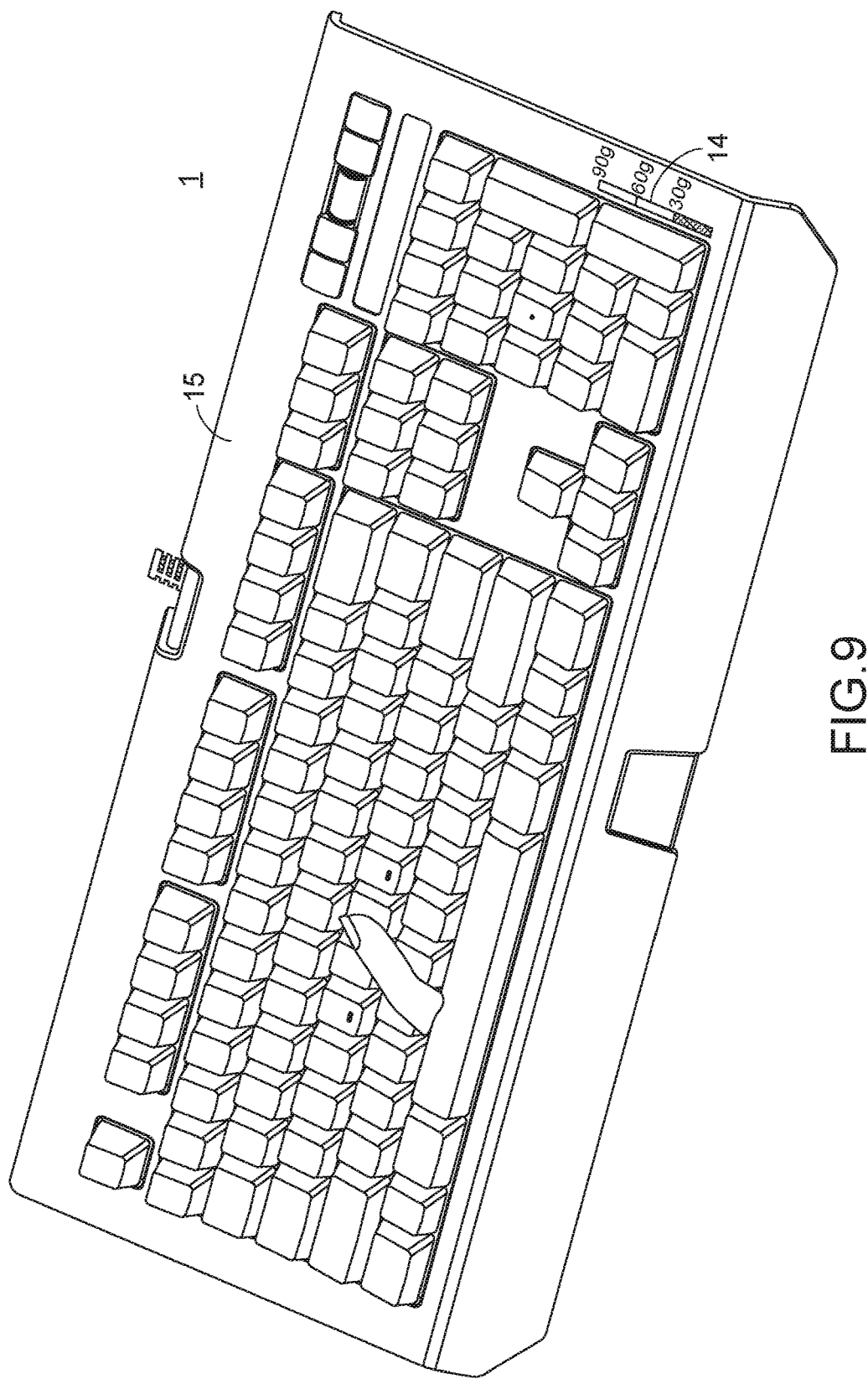
FIG. 9 is a schematic top view illustrating the force-sensitive input device according to the embodiment of the present invention, in which the key is pressed down to the shallower position and the display module emits light beams in a third illuminating model.
Figure 10:
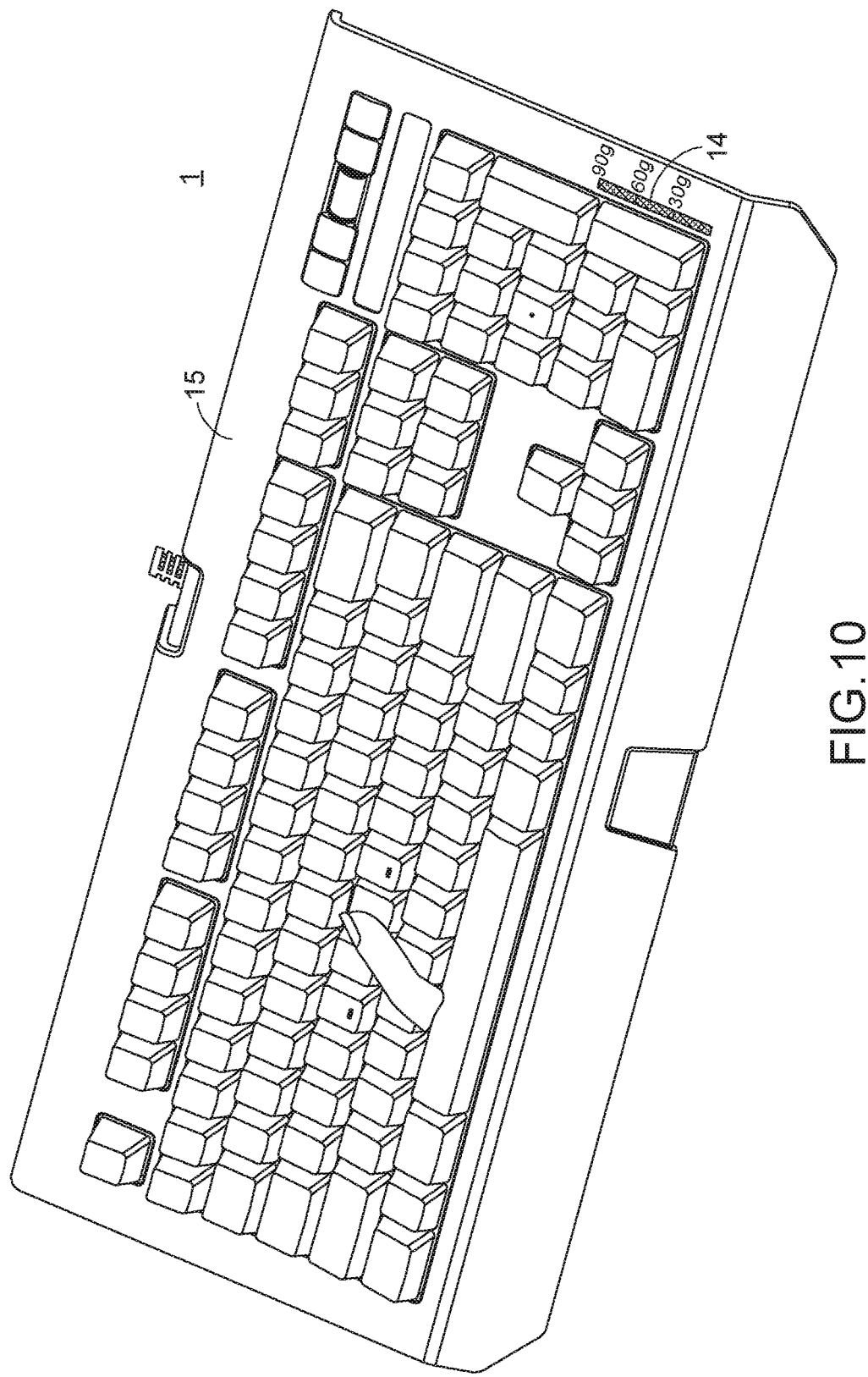
FIG. 10 is a schematic top view illustrating the force-sensitive input device according to the embodiment of the present invention, in which the key is pressed down to the deeper position and the display module emits light beams in the third illuminating model.

The third illuminating model of the display module 14 will be described with reference to FIGS. 9 and 10. FIG. 9 is a schematic top view illustrating the force-sensitive input device according to the embodiment of the present invention, in which the key is pressed down to the shallower position and the display module emits light beams in a third illuminating model. FIG. 10 is a schematic top view illustrating the force-sensitive input device according to the embodiment of the present invention, in which the key is pressed down to the deeper position and the display module emits light beams in the third illuminating model. Please refer to FIGS. 2, 3, 4, 9 and 10. In the third illuminating model, the display module 14 is arranged beside the keys 12. Preferably, the display module 14 is disposed on an edge of a surface of the casing 15 and exposed outside the casing 15. Preferably but not exclusively, the light-emitting elements 140 of the display module 14 are continuously arranged as a reading meter. In another embodiment, the light-emitting elements 140 are arranged as indication lamps. Moreover, the magnitude of the pressing force exerted on the key 12 and sensed by the corresponding force sensing module 13 is in a force sensing range. The force sensing range includes a low force range and a high force range. The reading meter indicates a low level brightness indication and a high level brightness indication. Similarly, when the key 12 is pressed down to the shallower position, the magnitude of the pressing force exerted on the key 12 and sensed by the corresponding force sensing module 13 is in the low force range. Consequently, the display module 14 emits the light beams to illuminate the low level brightness indication. In an embodiment, the low level brightness indication is illuminated when the pressing force of the user is in the range between 0 and 30 grams. When the key 12 is pressed down to the deeper position, the magnitude of the pressing force exerted on the key 12 and sensed by the corresponding force sensing module 13 is in the high force range. In an embodiment, the display module 14 emits the light beams to illuminate the high level brightness indication and the low level brightness indication simultaneously. Alternatively, in another embodiment, the display module 14 emits the light beams to illuminate the high level brightness indication only. In an embodiment, the high level brightness indication is illuminated when the pressing force of the user is in the range between 60 and 90 grams. Since the display module 14 is implemented with the reading meter, the user can realize the magnitude of the pressing force and trigger the desired function. Of course, the level brightness indications of the reading meter are not restricted to the low level brightness indication and the high level brightness indication.

From the above descriptions, the present invention provides the force-sensitive input device. The force sensing module is used for sensing the magnitude of the pressing force that is exerted by the user. While the magnitude of the pressing force is received by the force sensing module, a sensing signal is generated and issued to the display module. According to the sensing signal, the magnitude of the pressing force is indicated by the display module. According to the magnitude of the pressing force, the user can confirm whether the magnitude of the pressing force on the key reaches the set value. Consequently, the function corresponding to the magnitude of the pressing force is precisely triggered.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A force-sensitive input device, comprising:
   a circuit board;
   plural keys disposed on the circuit board, wherein each of the plural keys comprises a keycap, a main body, a triggering element and an elastic element, wherein the main body is located under the keycap, the triggering element is connected with the keycap and linked with the keycap, a first end of the elastic element is contacted with the main body or the circuit board, and a second end of the elastic element is contacted with the keycap or the triggering element, wherein as the keycap is moved downwardly in response to a pressing force, the triggering element is descended and the elastic element is subjected to deformation so as to store elastic potential energy;
   plural force sensing modules located under the corresponding keys, wherein when one of the plural keys is pressed down, the force sensing module corresponding to the pressed key senses a magnitude of the pressing force on the pressed key and generates a corresponding sensing signal;
   a display module disposed on the circuit board, wherein the display module illuminates according to the sensing signal from the corresponding force sensing module, wherein the display module comprises plural light-emitting elements, and the plural light-emitting elements are disposed on the circuit board and located under the corresponding keys, wherein the keycap is made of a transparent material, so that a light beam emitted by the corresponding light-emitting element is transmissible through the keycap; and
   a casing, wherein the circuit board, the plural keys, the plural force sensing modules and the display module are disposed within the casing, and the keycap of each key is penetrated through the casing and exposed outside the casing,
   wherein the magnitude of the pressing force exerted on the pressed key and sensed by the corresponding force sensing module is within a force sensing range, and the force sensing range includes a low force range and a high force range, wherein if the magnitude of the pressing force exerted on the pressed key and sensed by the corresponding force sensing module is within the low force range, the light-emitting element corresponding to the pressed key emits the light beam with a first light color, wherein if the magnitude of the pressing force exerted on the pressed key and sensed by the corresponding force sensing module is within the high force range, the light-emitting element corresponding to the pressed key emits the light beam with a second light color.

2. A force-sensitive input device comprising:
   a circuit board;
   plural keys disposed on the circuit board, wherein each of the plural keys comprises a keycap, a main body, a triggering element and an elastic element, wherein the main body is located under the keycap, the triggering element is connected with the keycap and linked with the keycap, a first end of the elastic element is contacted with the main body or the circuit board, and a second end of the elastic element is contacted with the keycap or the triggering element, wherein as the keycap is moved downwardly in response to a pressing force, the triggering element is descended and the elastic element is subjected to deformation so as to store elastic potential energy;

plural force sensing modules located under the corresponding keys, wherein when one of the plural keys is pressed down, the force sensing module corresponding to the pressed key senses a magnitude of the pressing force on the pressed key and generates a corresponding sensing signal;

a display module disposed on the circuit board, wherein the display module illuminates according to the sensing signal from the corresponding force sensing module, wherein the display module comprises plural light-emitting elements, and the plural light-emitting elements are disposed on the circuit board and located under the corresponding keys, wherein the keycap is made of a transparent material, so that a light beam emitted by the corresponding light-emitting element is transmissible through the keycap; and a casing, wherein the circuit board, the plural keys, the plural force sensing modules and the display module are disposed within the casing, and the keycap of each key is penetrated through the casing and exposed outside the casing, wherein the magnitude of the pressing force exerted on the pressed key and sensed by the corresponding force sensing module is within a force sensing range, and the force sensing range includes a low force range and a high force range, wherein if the magnitude of the pressing force exerted on the corresponding key and sensed by the corresponding force sensing module is within the low force range, the light-emitting element corresponding to the pressed key and neighboring light-emitting elements emit the light beams with a first light color, wherein if the magnitude of the pressing force exerted on the pressed key and sensed by the corresponding force sensing module is within the high force range, the light-emitting element corresponding to the pressed key and the neighboring light-emitting elements emit the light beams with a second light color.

3. A force-sensitive input device comprising:

a circuit board;

plural keys disposed on the circuit board, wherein each of the plural keys comprises a keycap, a main body, a triggering element and an elastic element, wherein the main body is located under the keycap, the triggering element is connected with the keycap and linked with the keycap, a first end of the elastic element is contacted with the main body or the circuit board, and a second end of the elastic element is contacted with the keycap or the triggering element, wherein as the keycap is moved downwardly in response to a pressing force, the triggering element is descended and the elastic element is subjected to deformation so as to store elastic potential energy;

plural force sensing modules located under the corresponding keys, wherein when one of the plural keys is pressed down, the force sensing module corresponding to the pressed key senses a magnitude of the pressing force on the pressed key and generates a corresponding sensing signal;

a display module disposed on the circuit board, wherein the display module illuminates according to the sensing signal from the corresponding force sensing module; and a casing, wherein the circuit board, the plural keys, the plural force sensing modules and the display module are disposed within the casing, and the keycap of each key is penetrated through the casing and exposed outside the casing, wherein the display module comprises plural light-emitting elements, and the plural light-emitting elements are disposed on the circuit board, arranged beside the plural keys and exposed outside the casing, wherein the plural light-emitting elements of the display module are continuously arranged as a reading meter, and the reading meter indicates a low level brightness indication and a high level brightness indication, wherein the magnitude of the pressing force exerted on the corresponding key and sensed by the corresponding force sensing module is within a force sensing range, and the force sensing range includes a low force range and a high force range, wherein if the magnitude of the pressing force exerted on the pressed key and sensed by the corresponding force sensing module is within the low force range, the low level brightness indication is illuminated, wherein if the magnitude of the pressing force exerted on the pressed key and sensed by the corresponding force sensing module is within the high force range, the low level brightness indication and the high level brightness indication are simultaneously illuminated, or the low level brightness indication is illuminated but the high level brightness indication is not illuminated.

\* \* \* \* \*